US006823670B2

(12) United States Patent
Simburger et al.

(10) Patent No.: US 6,823,670 B2
(45) Date of Patent: Nov. 30, 2004

(54) INFLATABLE EVAPORATION GAS CELL STRUCTURE SYSTEM

(75) Inventors: Edward J. Simburger, Agoura, CA (US); Siegfried W. Janson, Redondo Beach, CA (US); Henry Helvajian, Pasadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 172 days.

(21) Appl. No.: 10/166,882

(22) Filed: Jun. 11, 2002

(65) Prior Publication Data

US 2003/0226356 A1 Dec. 11, 2003

(51) Int. Cl.[7] .............................................. F16D 31/02
(52) U.S. Cl. ........................................ 60/409; 52/2.23
(58) Field of Search ................................ 52/2.21, 2.22, 52/2.23; 60/409, 412, 432; 92/90, 91, 92; 114/345; 244/905; 441/31, 40

(56) References Cited

U.S. PATENT DOCUMENTS 3,858,392 A  *  1/1975  Evans et al. .................. 60/637
5,065,640 A  * 11/1991  Koren et al. .................. 74/469

* cited by examiner

*Primary Examiner*—F. Daniel Lopez
(74) *Attorney, Agent, or Firm*—Derrick Michael Reid (57) ABSTRACT

An inflatable structure includes a plurality of inflation cells each have a respective internal gas generator connected to an external control processor for sequential inflation of the inflatable structure. Power and control lines feed through the inflation cells for powering the internal gas generator and for communicating control signals between the gas generators and the external control processor. A method of sequence inflation can use various types of exemplar gas generators, such as cellular containment evaporation gas generators and laser ablation gas generators.

10 Claims, 6 Drawing Sheets

STOWED INFLATABLE STRUCTURE

FIG. 3A

INFLATING INFLATABLE STRUCTURE

FIG. 3B

INFLATED INFLATABLE STRUCTURE

FIG. 3C

MEMS GAS GENERATOR

FIG. 4

LASER MEMS GAS GENERATOR

FIG. 5

INFLATABLE EVAPORATION GAS CELL STRUCTURE SYSTEM

REFERENCE TO RELATED APPLICATION

The present application is one of three related applications including application entitled Inflatable MEMS Evaporation Gas Cell Structure System Ser. No. 10/166,882 filed Jun. 11, 2002, application entitled Inflatable Gas Cell Structure Deploying Method, Ser. No. 10/166,881, filed Jun. 11, 2002, and having a terminal disclaimer, and application entitled Inflatable MEMS Ablation Gas Cell Structure System, Ser. No. 10/171,715 filed on Jun. 12, 2002 and having a terminal disclaimer, which three applications all having a common named inventor and all assigned to a common assignee.

FIELD OF THE INVENTION

The present invention relates to the field of inflatable structures. More particularly, the present invention relates to sequential controlled gas generation in a plurality of respective cells of a cellular inflatable structure for preferred potential use during inflation of inflatable structures on orbiting spacecraft.

BACKGROUND OF THE INVENTION

Presently, conventional space systems utilize a number of different mechanical schemes for deploying antennas, solar arrays and payload sensors, which reside on an orbiting spacecraft. One such system deploys rigid honeycomb panels in the case of solar arrays or masts with antenna elements attached in the case of antennas. Particularly for solar panels, a power sphere deployment scheme has been patented teaching the use of sublimation powders contained in frame cells of an inflatable structure. These microsatellites and nanosatellites have an overall small surface area. The deployable power sphere is made of external solar panels configured in an approximate sphere shape for providing an attitude insensitive high solar collection area with low weight and with low stowage volume. The power sphere deployment method required an inflatable deployment sequence that moves the individual flat panels from the stacked stowage configuration to an unfolded deployed configuration where the individual panels form the spherical solar array structure upon completion of the deployment sequence. Ideally, the deployment of primary, secondary, and tertiary polygon panels of the power sphere is sequential and controlled. Inflatable frames around each of the polygonal panels are inflated sequentially so that the stacked set of polygons complete deploying movement in a controlled sequence from the stacked stowed configuration to the deployed configuration. Sublimation powders in the frame cells provide sufficient gas pressure to unfurl the stack during the deployment sequence as the sublimation powder expands into a gaseous state when the panels are released in turn as the power sphere is deployed. This deployment scheme is based upon sequential releases, and not sequential control, of the panels, where the sequence is based on the sequential stacking order of the panels with the use of expanding sublimation powders in each of the frames. The use of sublimation powder does not provide for direct sequential control of the inflation process, but rather relies solely on the sequence of stacking of the panels into the stacked stowage configuration prior to launch.

To accomplish electronically controlled sequential deployment of a cellular inflatable structure, a conventional inflation system requires a complicated set of control valves, one or more gas canisters, and necessary gas tubing to supply the gas in controlled sequence. The gas tubing runs from a gas canister to all of the individual cells of the inflatable structure. Gas tubing disadvantageously extends through the walls of the cellular structure increasing failure rates where the tubing penetrates the walls, which can fail with high leakage rates. The use of mechanical valves and gas canisters adds significant weight to the inflatable structure and reduces the overall reliability of the deployment system. Hence, conventional gas canister deployment systems disadvantageously have significant structural weaknesses and large mass requirements. With the advent of thin film solar cells and the use of thin film devices, the mass of a conventional deployment system may be disadvantageously many times greater than the deployed apparatus, such as a deployed solar array or deployed antenna. To reduce overall weight and provide sequential inflation control, there exists a need for new designs using new lightweight materials for deploying inflatable structures of a spacecraft after launch.

Presently, microelectromechanical systems (MEMS) devices are being developed. MEMS processing techniques are preferred in a space application where mass allowance budgets are critical requirements. These MEMS devices include thrusters and pressure transducers, fabricated on silicon chips, using microelectronics manufacturing techniques. Other MEMS devices include addressable arrays for fuel cells for providing sequentially controlled combustion thrust. However, MEMS devices that would otherwise provide inflation gas would still require extensive intercellular gas tubing and gas release control valves for controlled deployment, but having undesirable excessive weight and inherently low reliability. These and other disadvantages are solved or reduced using the invention.

SUMMARY OF THE INVENTION

An object of the invention is to provide a method of sequentially controlling the inflation of a cellular inflatable structure.

Another object of the invention is to provide a method of sequentially controlling the inflation of a cellular inflatable structure having gas generators inside respective cells of the cellular inflatable structure.

Yet another object of the invention is to provide a system for sequentially controlling the inflation of a cellular inflatable structure having evaporation gas generators inside respective cells of the cellular inflatable structure.

Still another object of the invention is to provide a system for sequentially controlling the inflation of a cellular inflatable structure having ablation gas generators inside respective cells of the cellular inflatable structure.

The present invention is directed to a generalized method and specific system means for sequentially controlled inflation of inflation cells in a cellular inflatable structure having only electronic control and power lines integrated into the walls of each cell. A gas MEMS device capable of generating an inflation gas is disposed in each of the cells and used for controlled sequential deployment of the inflation cells of the space inflatable structure. The MEMS device could enable small increments of gas release so that the amount of gas in each cell and the inflation sequence is electronically controlled.

The gas MEMS device contains all of the associated electronics for controlling the release of gas to the inflatable structure and determining the resultant pressure change in the inflatable structure. The control electronics is capable of executing a preprogrammed inflation sequence and of communicating status along with any measured parameters, to a central spacecraft processor unit. The MEMS devices preferably operate using DC current and control lines supplied from a spacecraft bus. In a general aspect of the invention, a method is used to inflate the cellular inflatable structure where a gas MEMS device is disposed in each cell with the MEMS devices being sequentially controlled to sequentially inflate the inflatable structure. In a first aspect of the invention, evaporation gas MEMS devices are disposed in respective cells of the cellular inflation structure for sequential controlled inflation. In a second preferred aspect of the invention, ablation gas MEMS devices are disposed in respective cells of the cellular inflation structure for sequential controlled inflation of the of the cell. These and other advantages will become more apparent from the following detailed description of the preferred embodiment.

DETAILED DESCRIPTION OF THE PREFERRED EMBODIMENT

Figure 1:
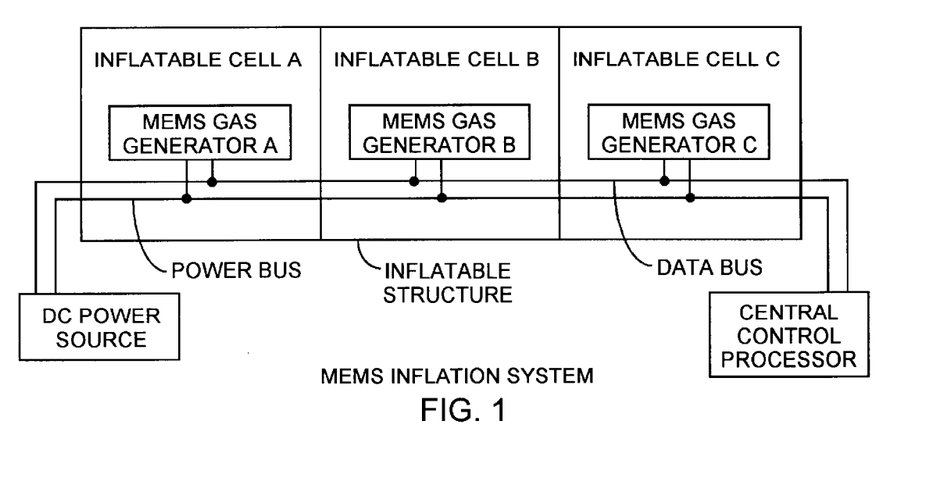
FIG. 1 is a block diagram of a MEMS inflation system.
Figure 2:
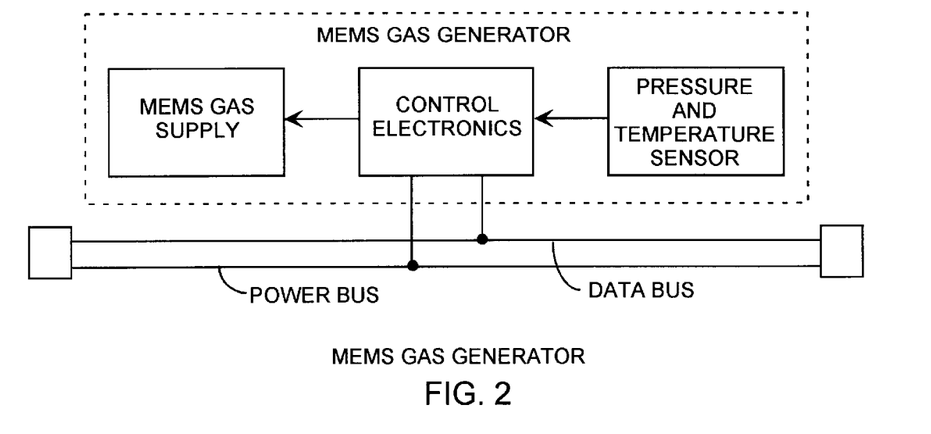
FIG. 2 is block diagram of a MEMS gas generator.
Figure 3A:
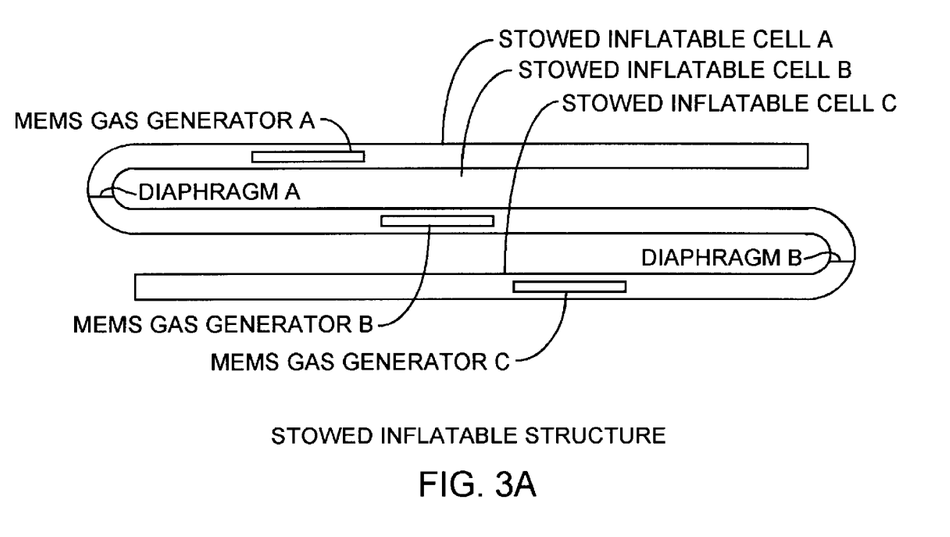
FIG. 3A is a diagram of a stowed inflatable structure.
Figure 3B:
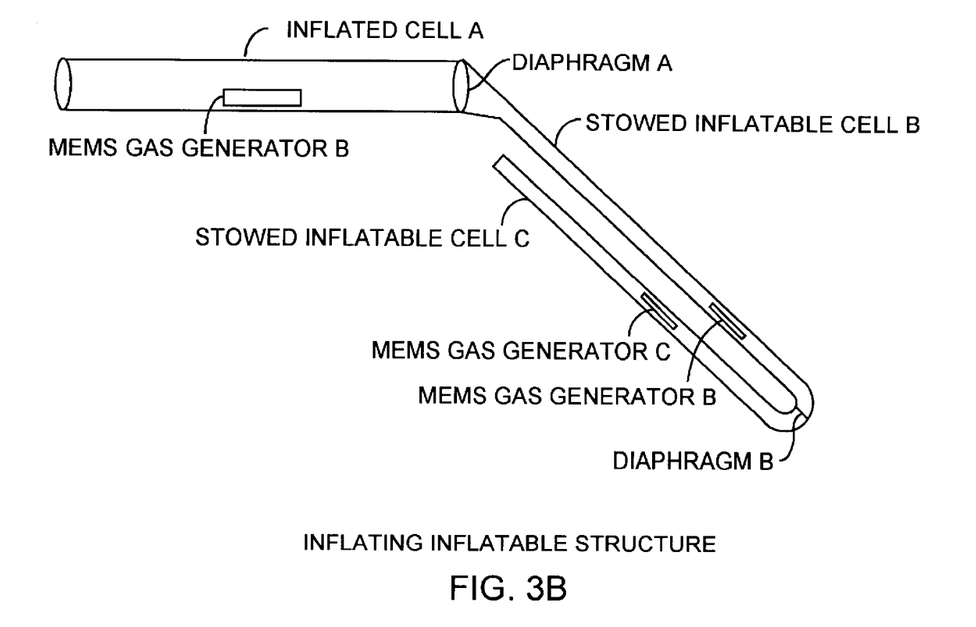
FIG. 3B is a diagram of an inflating inflatable structure.
Figure 3C:
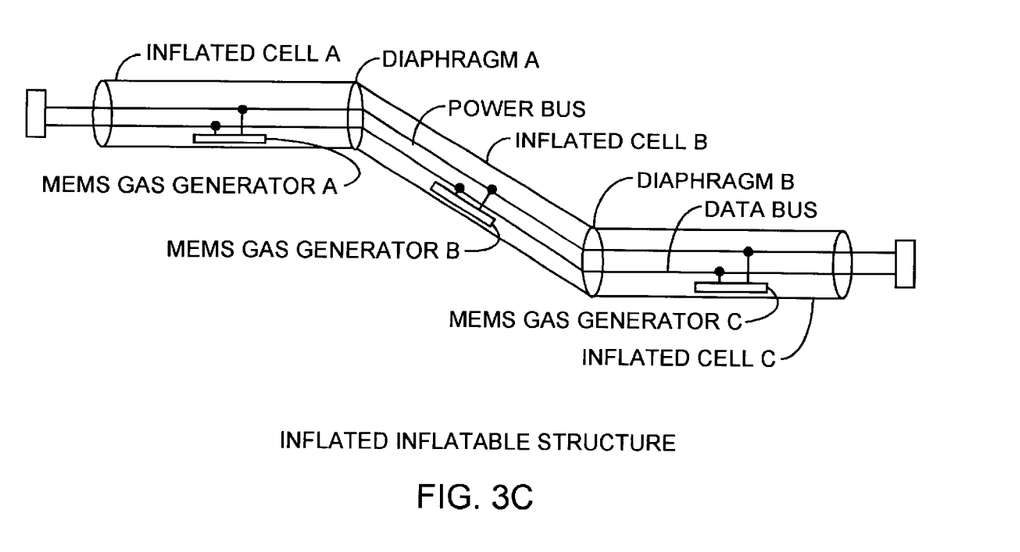
FIG. 3C is a diagram of an inflated inflatable structure.

An embodiment of the invention is described with reference to the figures using reference designations as shown in the figures. Referring to FIGS. 1 and 2, a microelectromechanical system (MEMS) inflation system includes an inflatable structure that has a plurality of inflatable cells such as cells A, B and C, in which a respective MEMS gas generator, such as respective MEMS generators A, B and C are disposed. The MEMS gas generators are connected to a DC power source through a power bus and connected to a central control processor through a data bus. The power bus and data bus feed through the cells A, B and C so as to connect to the respective MEMS gas generators A, B and C. The MEMS gas generators derive electric power and control signals from the two wire power bus and data bus that are integrated onto the thin film material of the cells of the inflatable structure. The pressure and temperature sensors are used for monitoring the inflation of the respective cell. Each gas generator is mounted within a closed portion of the cell and releases precise amounts of inflation gas when commanded by a central control processor. Each MEMS gas generator includes a MEMS gas supply and control electronics for activating the MEMS gas supply. The MEMS generator may preferably include a temperature and pressure sensor for improved control over activating the MEMS gas supply. Each of the MEMS gas generators is preferably fabricated on a single integrated silicon chip as a MEMS device with necessary control electronics, gas storage and feedback control sensors necessary for controlling the release of gas into the inflatable structure. The MEMS gas generators have imbedded control electronics and pressure sensors as part of a distributed inflation system for the inflatable structure. The inflation system utilizes a plurality of gas generators for precisely controlling a deployment sequence of the inflatable structure. After inflation, the gas generators may release additional amounts of stored gas during mission duration to make up for leakage due to possible a micrometeoroid puncture of the inflatable structure as sensed by the sensor.

Referring to FIGS. 1 through 3C, the inflatable structure may include inflatable cells that may be solar flat panels of a power sphere. The panels are stowed as a stack during the launch phase of a space mission as a stowed inflatable structure. Once on orbit, the stack of flat panels could be deployed as controlled by the central control processor. The inflatable structure ideally would be capable of implementing a sequential deployment of the primary and secondary polygons of the power sphere. The inflation system supplies the mechanical energy required to unfurl the stowed stack of flat panels into the correct deployed position by sequential inflation of individual cells. During the inflation sequence, a first cell is inflated such as inflated cell A. Then the next cell is inflated in turn, such as inflated cell B. Finally, the last cell, such as cell C is inflated. The sequential inflation of the cells allows the inflatable structure to be inflated in a desired control sequence for proper unfurling of the inflatable structure. The inflation process continues until all of the cells of the inflatable structure have been deployed through inflation to a desire pressure level in each cell.

After deployment, the gas generators maintain pressure in the respective cells of the inflatable structure by continuously monitoring the pressure and releasing small incremental amounts of gas to maintain the desired pressure. This monitoring and releasing process continues until all of the stored gas in the MEMS gas generators has been released. Because the actual pressure required to maintain an inflatable structure is typically very low, the total amount of gas that will be required can be contained in a small volume provided the gas is stored in a liquid or solid phase. The gas can be stored, for example, as a sublimation powder or a liquid phase gas stored under pressure.

In a preferred form, the cells can be fabricated from Mylar with separating diaphragms, such as diaphragm A separating cells A and B, and diaphragm B separating cells B and C. The power and data bus would preferably feed through these diaphragms for routing the power bus and data bus to the gas generators A, B and C. An apparent alternative to routing power and data lines through the cell walls, is to place respective thin film batteries inside each of the cells along with microtransmitters and microreceivers. However, power and data microtraces deposited as thin copper traces on the Mylar film that makes up the inflatable structure can feed through the separating diaphragms using the same bonding adhesives to bond to the diaphragms for adequate leakage sealing the cells A, B and C. The cells can be made of tubes of various flexible materials, such as Mylar. Mylar circular separating diaphragms at each cell end can be bonded to tube sections of Mylar. These cellular tubes could be, for example, frames of a solar panel of a power sphere. A minimum of two electrical traces is needed for the power bus. Depending of desired application and control, the data bus can have several traces, but serial data can be transmitted over two traces with serial communications capability by using, for example, an embedded serial controller in the MEMS gas generator. The trace conductors are preferably thin film traces deposited or electro-plated onto the thin film membrane of the inflatable cells of the inflatable structure. These trace conductors provide both power from a power supply and control signals from a central control processor. These traces are routed to all of the gas generators. The central control processor provides control signals to the gas generator and may also receive transducer data from the individual MEMS gas generators using, for example, a serial addressable data bus for communicating pressure data and gas supply reserve data.

The central control processor, like the MEMS gas generators, is connected to the power supply and communicates data over the data bus. Both the MEMS gas generators and the central control processor would interface to exchange digital information for controlling the inflation sequence and maintaining desired pressures in the inflatable cells. The central control processor can be programmed using programmed memory to perfect the desired deployment sequence, and when activated, generates commands to gas generators to deploy the inflatable structure with each gas generator having, for example, an address selected by address data communicated over the data bus so as to command the release of gas within respective inflatable cells to enable the deployment sequence. The MEMS gas generators require control electronics for serial addressable data bus communications and preferably includes a processor or controller that executes the commands received from the central control processor, and also provide sensory data back to the central control processor. The sensory data may include current temperature, current pressure, amount of gas released, and an amount gas in reserve.

Hence, the individual MEMS gas generators preferably include a gas generation means, pressure and temperature sensors, control electronics, bus interface electronics, and a programmed processor. Based upon commands received from the central control processor, the MEMS gas generators preferably generate incrementally small amounts of inflation gas. As such, the gas generators can be programmed with a controlled inflation algorithm for determining the correct amount of inflation gas that would be required for the deployment of the individual inflatable cell to reach a predetermined pressure based upon the temperature and resultant pressure change that would result from the release of a incremental amount of gas. The pressure and temperature transducer sensor provides feedback information for the controlled inflation algorithm. The individual MEMS gas generators can communicate the progress of the inflation process to the central control processor. Based upon the received information, the central control processor can determine the status of the deployment, and when specific criteria are met, sequence the inflation process to the next inflatable cell in turn during the deployment sequence, by, for example, commanding the next one of the MEMS gas generator to initiate inflation of a respective next cell.

Figure 4:
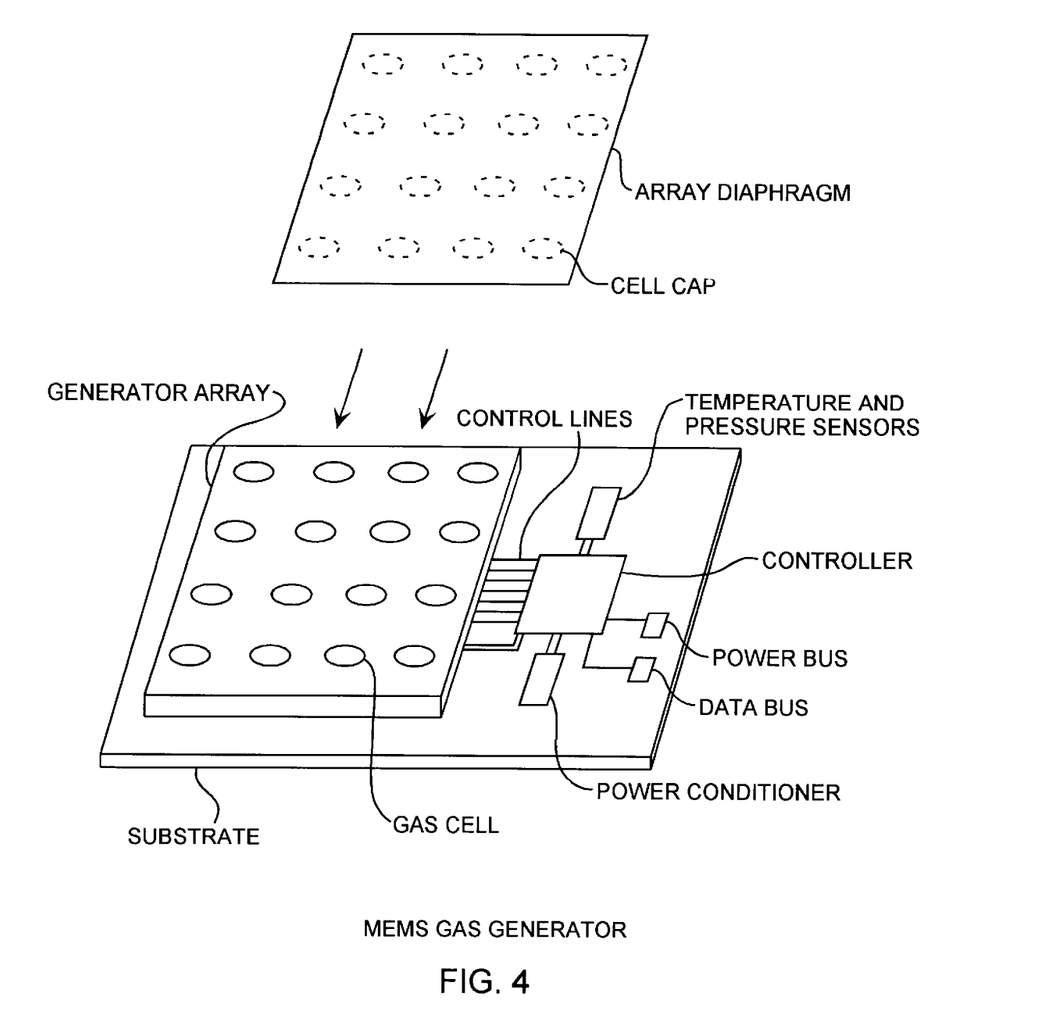
FIG. 4 is a diagram of an evaporator MEMS gas generator.

Referring to FIGS. 1 through 4, and particularly to FIG. 4, there are many types of gas generators that can be used. Preferably, the gas generators are small in size, such as a MEMS gas generator. The MEMS gas generator has a common substrate that can be used as a multi-chip substrate or circuit board and is preferably composed of ceramic, glass, silicon, or other suitable semiconductor processing material. One such MEMS gas generator unit can have individual gas storage cells each containing a small fixed quantity of gas in a liquid phase that would evaporate into a gas. Microfabrication technology is used to fabricate a gas storage containment system, such as the gas generator array of individually activated cells. By releasing the gas in each cell in turn, gas is released in fixed incremental steps as each cell is activated. The gas cell array is part of the gas generator disposed on the substrate along with the power bus, control bus, temperature and pressure sensors, and necessary control lines for interface to an external controller that may be a programmed microprocessor. The gas generator may also include a power conditioner for noise reduction and local power filtering and power regulation. Multiple functions are integrated together on individual silicon substrates and can be integrated together in an application specific integrated circuit. The MEMS gas generator can include a programmable gate array, a programmable logic array, a microprocessor, or a microcontroller for intelligent gas release. In an exemplar implementation, a single microprocessor chip with built-in analog-to-digital converters and serial communication, or a microcontroller with a transducer interface would be used. The gas generator array is used in a controlled manner for the purpose of controlled inflation and maintenance of the inflatable structure with inherent reliability of monolithic silicon electronic chips. Particularly, the gas generator is solid state without any moving parts so as to increase overall reliability. For redundancy, multiple gas generators can be installed in each inflatable cell for preventing single point failure points.

Each gas generator is preferably disposed on a single silicon wafer including a gas containment system, and control electronics for generating the electrical control impulses over the control lines to the gas containment system for incrementally releasing the gas. The gas generators can utilize various types of gas generating substances, such as combustible solids, combustible liquids, liquid electrolytes, subliming solids, or evaporation liquids. In the case of evaporation, a solid material changes phase to a liquid, and then changes phase to a gas that can be aided with generalized heating. In the case of subliming solids, the solid gas material may change phase from a solid to a gas with generalized warming over the entire solid. In the case of ablation, intense localized heating or optical excitation can serve to ablate the solid gas material into a gas at a localized irradiation heating point. Solid or liquid mass portions are converted into lower-density gas on command by electric control over the control lines to the gas containment system. For example, liquid or solid gas precursors can be contained in individual gas cells that are unsealed by rupturing thin cell caps formed in a thin array diaphragm. In the case of a gas generator array, an array diaphragm has thin cell caps that are selectively ruptured in turn by electrical conduction through selected control lines. The cell caps can be formed by chemical etching the array diaphragm in cap locations over the cell container. The selective rupturing of the cell caps of the array diaphragm provides controlled gas release in incremental amounts. An alternative form would use cell caps that open when the cell pressure exceeds a fixed pressure limit, and then close when the pressure is released.

The gas containment can be realized through the use of different gas conversion mechanism. The gas generator can use either active and passive properties of the solid or liquid gas material. A solid monopropellant that is an ignitable solid, such as lead styphnate, can be activated by a miniature exploding bridge wire or heater fabricated on the array diaphragm. The same ignitable solid can be exploded by microlaser or laser excitation irradiation. The array diaphragm can be any moderately thin solid that does not react with the monopropellant and will burst at the appropriate pressure, for example, a one-micron thick silicon nitride layer. A liquid monopropellant that is an ignitable liquid, such as hydrazine, can be activated by a miniature exploding bridge wire or heater fabricated on the super thin diaphragm as well. A liquid electrolyte, such as water, decomposes into hydrogen and oxygen gas through electrolysis. The electrolysis electrodes would be located on the sidewalls or bottom of the cells and connected to the control lines. The diaphragm can be any super thin solid that does not react with the electrolyte and will burst at the appropriate pressure. A subliming solid with an adequate vapor pressure, for example, boric acid, can be exposed and vaporized when the diaphragm is ruptured or melted by local heating. The diaphragm can be any thin solid that does not react with the subliming solid and will melt at a reasonable temperature, for example, an organic polymer film that melts at 200° C. Passing current through the control lines to a resistive patterned layer on the diaphragm causes melting of the diaphragm. The diaphragm may be electrically resistive and serve a cell cap layer over the containment cells. A liquid with an adequate vapor pressure, for example, Freon, can be exposed when the diaphragm is ruptured or melted by local heating. The diaphragm can be any thin solid that does not react with the liquid and will melt at a reasonable temperature, for example, an organic polymer film that melts at 200° C. Melting of the diaphragm is caused by passing current through a resistive patterned layer on the diaphragm. The diaphragm may be electrically resistive to generate the required melting heat. There are many different types of gas containment and release system that can be used as part of the gas generator.

Figure 5:
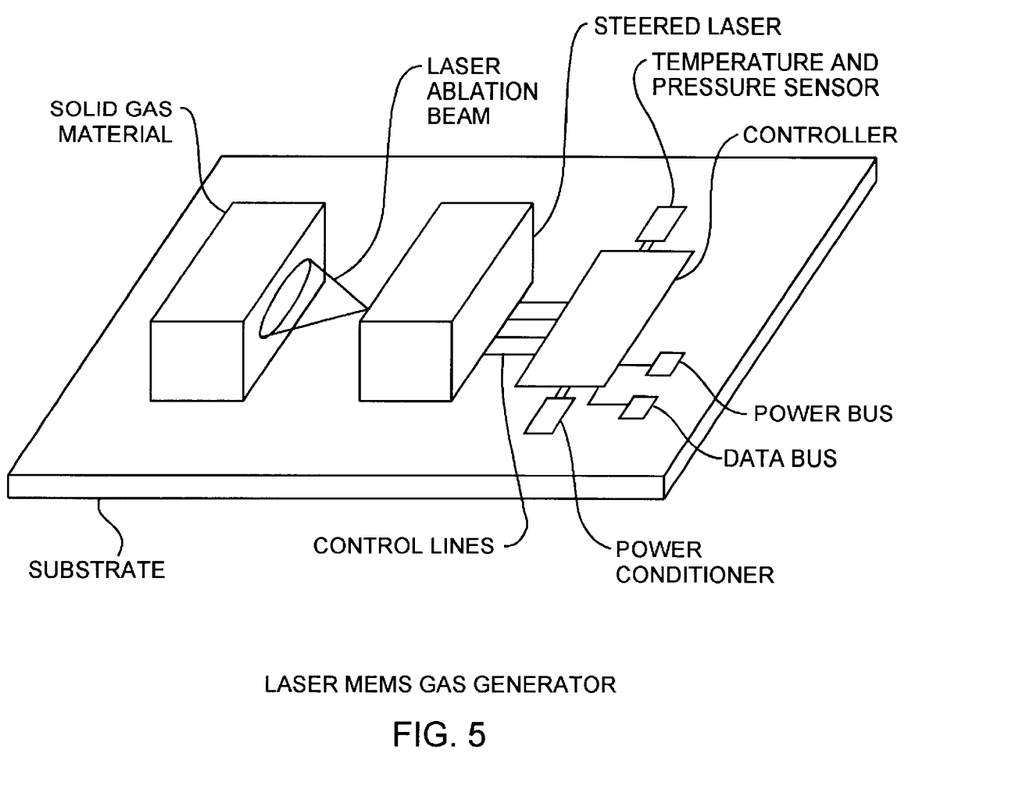
FIG. 5 is a diagram of a laser MEMS gas generator.

Referring to FIGS. 1 through 5, and particularly to FIG. 5, a laser gas generator has the same control and power processing electronics as the cellular containment gas generator but uses a laser and a solid gas material for generating amounts of desired gas. The laser MEMS gas generator is shown having a common substrate, on which is disposed the data bus, the power bus, the power conditioner, the temperature and pressure sensor, the controller, control lines, in addition to a laser. Rather than storage of gas in a liquid phase in individual storage cells, the stored gas is in a solid form by the solid gas material. The laser generates a laser beam that can be used for laser ablation when the solid gas material is illuminated at a high point intensity level. The laser beam can be steered for illuminating a solid gas material at various positions as the steered laser beam sweeps across the surface of the solid gas material. A solid state acousto-optical device or an electro-optical solid state device can be integrated with a laser, such as a microchip laser, to provide an all solid state laser that is steerable with applied voltages. The gas reaction and release occurs when energy is supplied by the laser, and ceases when the laser energy is terminated. Examples of ablation solid gas materials are azides, including $NaN_3$ and $KaN_3$, metal carbonyls, including $W(CO)_6$, and $Mn_2(CO)_{10}$) and plastics, such as polymethylmethacrylate. While in the case of the azides and carbonyls, the photofragmentation process leads to gaseous products. In the case of plastics the process leads to both gaseous and carbonaceous compounds. Gas generation is accomplished through an endothermic reaction. The reaction occurs only when sufficient energy is supplied from the laser. The laser beam can also be used to supply sufficient energy for creating a decomposition reaction in the solid gas material that then causes the release of gas. There is also a class of chemical explosives that can be optically laser excited, such as lead-styphate and RDX, which lead to gas generation.

The laser can be a pulsed laser focused on the surface of the solid gas material to initiate a photochemical reaction that releases gas, thereby creating a small hole in the solid ignitable material. The laser can then be steered to a fresh spot to initiate further gas release. The amount of gas release is metered by the pulse length of the laser and the number of pulses applied, in controlled amounts. The energy of the laser pulse is set for the specific photochemical interaction process. The laser can be pixilated with control for addressable ablation of the solid state material. A low power pulsed laser diode, semiconductor diode, solid state microchip, or a vertical cavity surface emitting laser can be used either in a pixilated array or as a single energy source. The pulsed laser diode wavelength is chosen to have an IR resonance with the solid gas source. The laser can use other wavelengths through standard nonlinear optical harmonic generation means. The laser is turned on for the amount of time to induce local heating or photochemistry of the gas source surface, which drives the local temperature very high or generates chemical radical compounds that lead to explosion. As such, the laser can be used with sublimation, evaporation, and ablation solids. The gas source for the gas generator is chosen such that upon heating, there is a high volatile component of the evaporated, sublimed, or ablated material. Resonantly tuned lasers can reduce the threshold energy required for gas generation. Depending on the laser selection, the laser can be made to operate in close contact with the gas source, as in an addressable array, or the laser can be set off some distance and sweep across the surface of the solid gas material.

Based upon commands from the central control processor, the laser MEMS gas generator is capable of generating precise incremental amounts of inflation gas. The laser gas generator controller contains an algorithm for determining the correct amount of inflation gas that would be required for the deployment of the individual inflatable cell based upon the temperature and pressure. The controller would then turn on the laser for the amount of time required to release an exact amount of gas. The pressure and temperature transducer sensor provides feedback information to the controller for monitoring and controlling this gas release process. The laser gas generator also communicates the progress of the deployment to the external control processor. Based upon communicated information, the central control processor determines the status of the deployment for controlled sequencing through the inflation sequence.

In nearly all cases of laser material interaction phenomena there is always the removal of some material that remains volatile and is not condensed. In the case of the laser gas generator, the solid gas material must contain a high fraction of volatile components that can be released upon photochemical reaction. It is known that plastics, such as PMMA, polyimide or Kapton, upon laser radiation, decompose by first releasing carbon monoxide. Azides $RN_3$, where R is a radical, are molecules that contain nitrogen that can be released upon laser irradiation. The azides are considered very energetic molecules and require little input energy to decompose. Molecules containing amine groups would also decompose via generation of nitrogen. Metal carbonyls are compounds containing carbon dioxide, for example, $W(CO)_6$, which have been developed for laser chemical vapor deposition applications. Nominally, these metal molecules have a vapor pressure at room temperature, but can be chemically altered for very low pressure. The advantage of these metal compounds is the direct release of CO compounds with the metal depositing and precipitating.

The present invention is directed to an inflatable structure having a plurality of cells, each of which encloses a respective gas generator. Power and data lines feed through the cells for controlling the release of the gas in incremental amounts. Internal gas generator controls and external supervisory controls, control the sequencing of the inflation during unfurling of the inflatable structure, and also serve to maintain the inflatable structure at desired pressure after deployment. Those skilled in the art can make enhancements, improvements, and modifications to the invention, and these enhancements, improvements, and modifications may nonetheless fall within the spirit and scope of the following claims.

What is claimed is:

1. A system for inflating an inflatable structure, the system comprising, inflatable cells for being pressurized by gas to inflate the inflatable cells into the inflatable structure from a stowed position to a deployed position, gas generators disposed in respective ones of the inflatable cells for generating the gas contained within the respective inflatable cells, a power source external to the inflatable cells for providing power, an external control processor for controlling sequential inflation of the inflatable cells of the inflatable structure from the stowed position to the deployed position, a power bus extending from the power source and passing through to respective interiors of the inflatable cells for providing power to the gas generators, and a data bus extending from the external control processor and through to the respective interiors of the inflatable cells for providing control signals to the gas generators, the external control processor communicating the control signals for controlling sequential inflation of the inflatable cells of the inflatable structure from the stowed position to the deployed position, wherein each of the gas generators is disposed in a respective inflatable cell of the inflatable cells, each of the gas generators comprises, a sensor for sensing pressure and temperature within the respective inflatable cell and for providing temperature and pressure signals, a generator controller for receiving the control signals from the external processor and for receiving temperature and pressure signals from the sensor, and a gas supply for generating gas for inflating the respective inflatable cell, the generator controller controlling the gas supply to release gas from the gas supply to inflate the respective inflatable cell to a desired pressure.

2. The system of claim 1 further comprising cell diaphragms for separating the inflation cells, the power bus and data bus pass through the cell diaphragms for interconnecting the gas generators within the inflatable cells.

3. The system of claim 1 wherein, the generator controller is for generating releases signals through internal control lines, the gas supply is a cellular gas supply comprising gas cells for generating gas by evaporation for inflating the respective inflatable cell, the generator controller controlling the gas supply to release gas from the gas supply to inflate the respective inflatable cell to the desired pressure, the cellular gas supply releasing gas in cellular increments to the desired pressure, and the gas supply further comprises a cellular diaphragm comprising cell caps disposed over the gas cells, each cell cap is ruptured by melting under electrical current through the internal control lines, each cell cap is ruptured in turn under control of the generator controller for incremental releasing of gas from the gas cells.

4. The system of claim 1 wherein, the generator controller is for receiving the control signals from the external control processor and for transmitting the pressure and temperature signals to the external control processor, the generator controller initiating inflation of the respective inflatable cell upon reception of an inflation control signal from the external control processor, and the gas supply for generating gas is for inflating the respective inflatable cell, the generator controller controlling the gas supply to release gas from the gas supply to inflate the respective inflatable cell.

5. The system of claim 1 wherein, the gas supply is a cellular gas supply comprising gas cells for containing a subliming solid with a vapor pressure for generating gas by evaporation for inflating the respective inflatable cell, the generator controller controlling the gas supply to release gas from the gas supply to inflate the respective inflatable cell to a desired pressure, the cellular gas supply releasing gas in cellular increments to the desired pressure, and the gas supply further comprises a cellular diaphragm comprising cell caps disposed over the gas cells, each cell cap is ruptured in turn under control of the generator controller for incremental releasing of gas from the gas cells.

6. The system of claim 1 wherein, the gas supply is a cellular gas supply comprising gas cells for containing a liquid for generating gas by evaporation for inflating the respective inflatable cell, the generator controller controlling the gas supply to release gas from the gas supply to inflate the respective inflatable cell to the desired pressure, the cellular gas supply releasing gas in cellular increments to the desired pressure, and the gas supply comprises a cellular diaphragm comprising cell caps disposed over the gas cells, each cell cap is ruptured in turn under control of the generator controller for incremental releasing of gas from the gas cells.

7. The system of claim 1 wherein, the gas supply is a cellular gas supply for generating gas for inflating the respective inflatable cell, the generator controller controlling the gas supply to release gas from the gas supply to inflate the respective inflatable cell to the desired pressure, the cellular gas supply releasing gas in cellular increments to the desired pressure.

8. The system of claim 1 wherein, the generator controller is for transmitting the pressure and temperature signals to the external control processor, and the gas supply is a cellular gas supply for generating gas for inflating the respective inflatable cell, the generator controller controlling the gas supply to release gas from the gas supply to inflate the respective inflatable cell to the desired pressure, the cellular gas supply releasing gas in cellular increments to the desired pressure.

9. The system of claim 1 wherein the gas generator is a microelectromechanical gas generator.

10. The system of claim 1 wherein the gas generator is a microelectromechanical gas generator comprising a power conditioner for conditioning power on the power bus.

* * * * *